(12) United States Patent
Kim et al.

(10) Patent No.: US 11,964,225 B2
(45) Date of Patent: Apr. 23, 2024

(54) AIR CLEANER

(71) Applicant: LG ELECTRONICS INC., Seoul (KR)

(72) Inventors: Myungsang Kim, Seoul (KR); Bonggyun Park, Seoul (KR); Yoosool Yoon, Seoul (KR); Cheolyeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 433 days.

(21) Appl. No.: 17/440,430

(22) PCT Filed: May 3, 2019

(86) PCT No.: PCT/KR2019/005336
§ 371 (c)(1),
(2) Date: Sep. 17, 2021

(87) PCT Pub. No.: WO2020/189842
PCT Pub. Date: Sep. 24, 2020

(65) Prior Publication Data
US 2022/0161176 A1 May 26, 2022

(30) Foreign Application Priority Data
Mar. 21, 2019 (KR) .................. 10-2019-0032599

(51) Int. Cl.
*B01D 46/42* (2006.01)
*B01D 46/00* (2022.01)
(Continued)

(52) U.S. Cl.
CPC ..... *B01D 46/0049* (2013.01); *B01D 46/4245* (2013.01); *B01D 46/429* (2013.01);
(Continued)

(58) Field of Classification Search
CPC ............ B01D 46/0049; B01D 46/4245; B01D 46/429; B01D 46/0005; B01D 46/0013;
(Continued)

(56) References Cited

U.S. PATENT DOCUMENTS

2006/0201119 A1  9/2006  Song
2017/0246582 A1  8/2017  Park et al.
(Continued)

FOREIGN PATENT DOCUMENTS

JP         2019-007674         1/2019
KR    10-2016-0080126         7/2016
(Continued)

OTHER PUBLICATIONS

European Search Report dated Oct. 19, 2022 issued in Application No. 19919654.4.
(Continued)

*Primary Examiner* — Frank M Lawrence, Jr.
(74) *Attorney, Agent, or Firm* — KED & ASSOCIATES

(57) ABSTRACT

An air cleaner according to an embodiment of the present disclosure includes: a main body including a main fan configured to generate air flow, a discharge part through which air passing through the main fan is discharged, a wireless power transmitter disposed on one side, and a power supply connected to the wireless power transmitter; and a flow switching device movably provided on the one side of the main body, wherein the flow switching device includes: a first guide tool configured to guide a first direction rotation of the flow switching device; a second guide tool configured to guide a second direction rotation of the flow switching device; and a wireless power receiver configured to supply power to the first guide tool and the second guide tool.

20 Claims, 14 Drawing Sheets

(51) Int. Cl.
*F24F 11/00* (2018.01)
*H02J 50/00* (2016.01)
*H02J 50/10* (2016.01)

(52) U.S. Cl.
CPC ............ *H02J 50/005* (2020.01); *H02J 50/10* (2016.02); *B01D 2273/30* (2013.01)

(58) Field of Classification Search
CPC B01D 46/4236; B01D 46/0047; B01D 46/46; B01D 46/58; B01D 46/24; B01D 46/4227; B01D 2273/30; H02J 50/005; H02J 50/10
USPC ........................... 55/392, 410, 411, 413–416
See application file for complete search history.

(56) References Cited

U.S. PATENT DOCUMENTS

| | | | | |
|---|---|---|---|---|
| 2018/0303303 | A1* | 10/2018 | Nyberg | A47L 5/24 |
| 2020/0298157 | A1* | 9/2020 | Kang | B01D 46/4245 |
| 2020/0298161 | A1* | 9/2020 | Jeon | B01D 46/0008 |
| 2020/0298168 | A1* | 9/2020 | Lee | B01D 46/46 |

FOREIGN PATENT DOCUMENTS

| | | |
|---|---|---|
| KR | 10-2017-0140583 | 12/2017 |
| KR | 10-2018-0000121 | 1/2018 |
| KR | 10-2019-0004114 | 1/2019 |
| KR | 10-2019-0011598 | 2/2019 |

OTHER PUBLICATIONS

International Search Report dated Dec. 20, 2019 issued in Application No. PCT/KR2019/005336.

* cited by examiner

【FIG. 1】
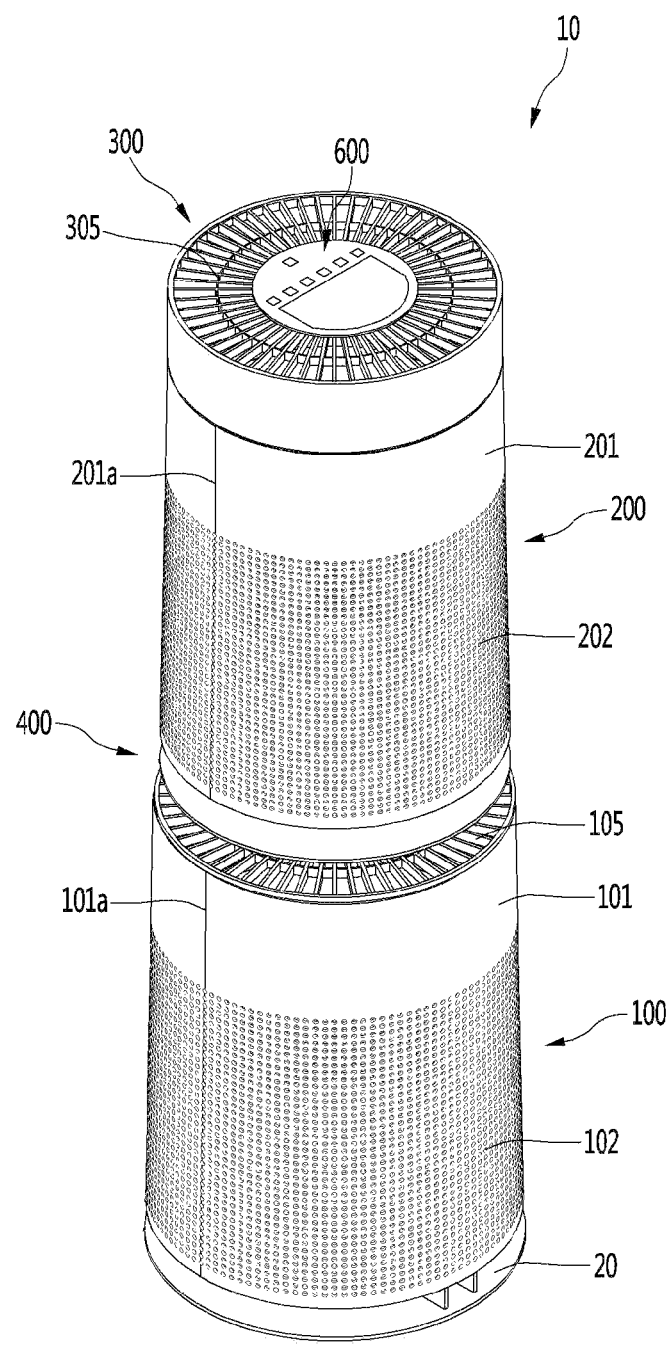

【FIG. 2】
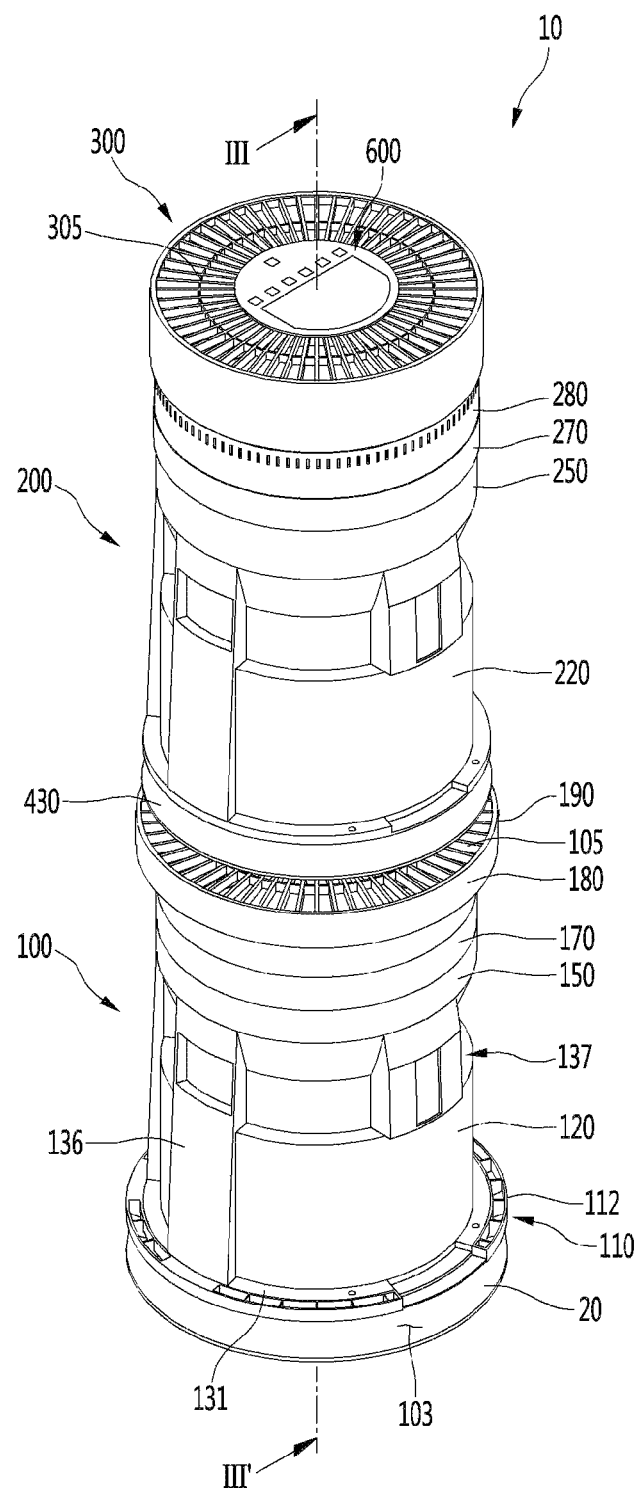

[FIG. 3]
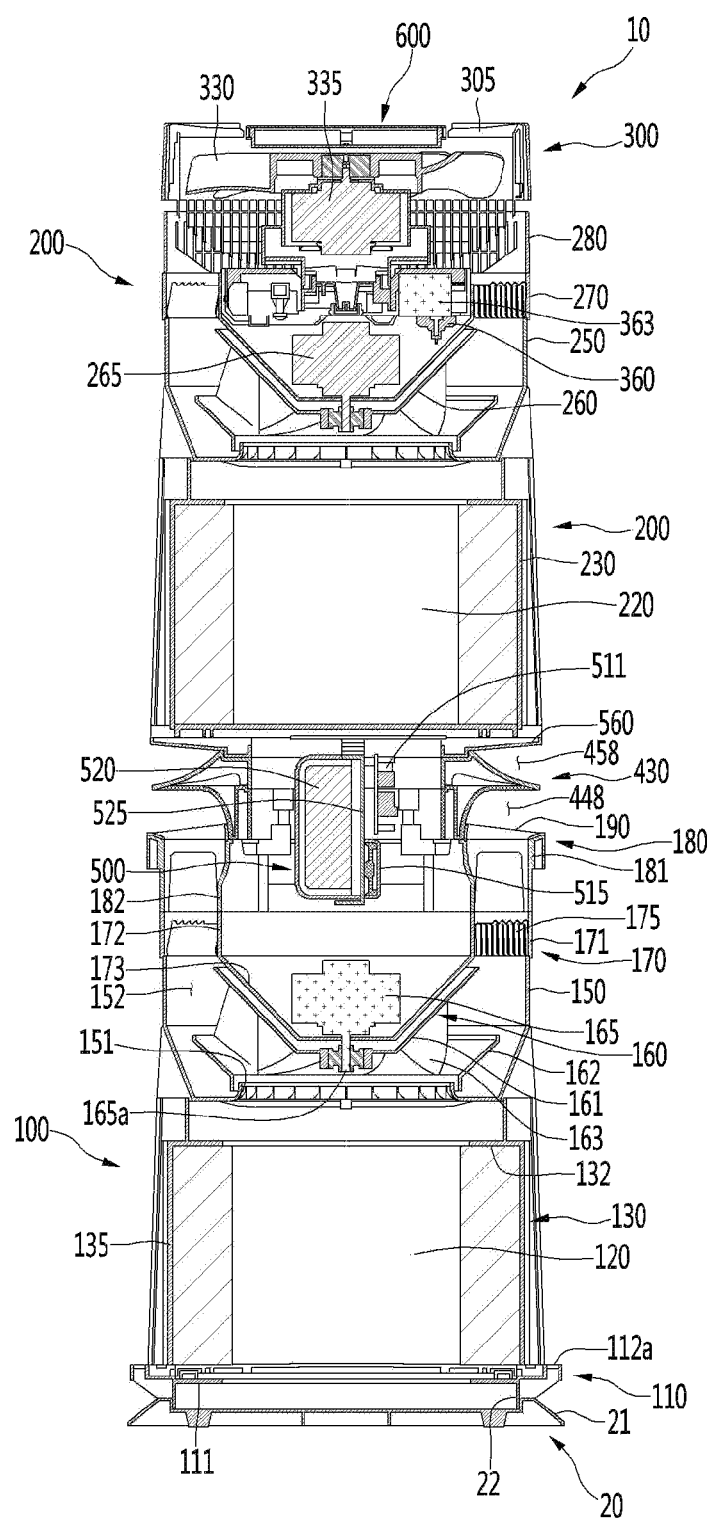

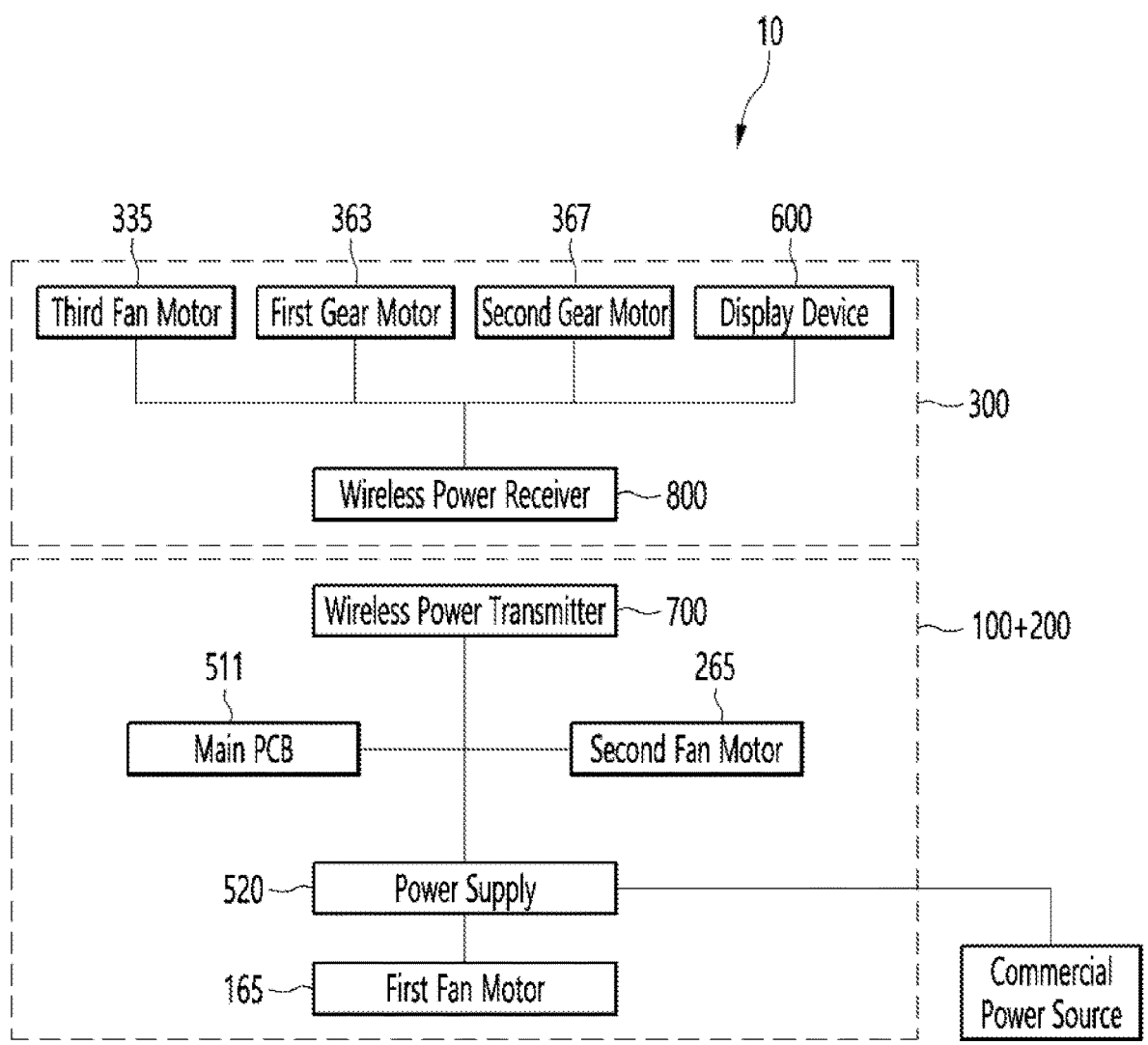
[FIG. 4]

[FIG. 5]
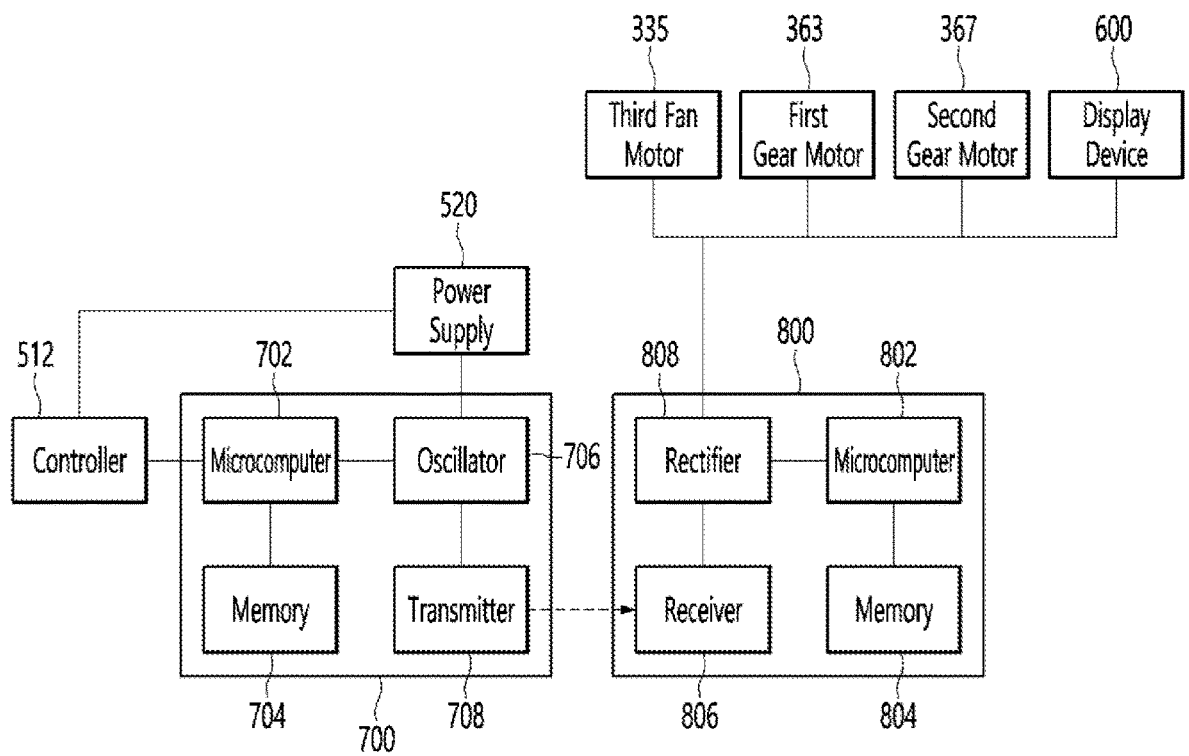

[FIG. 6]
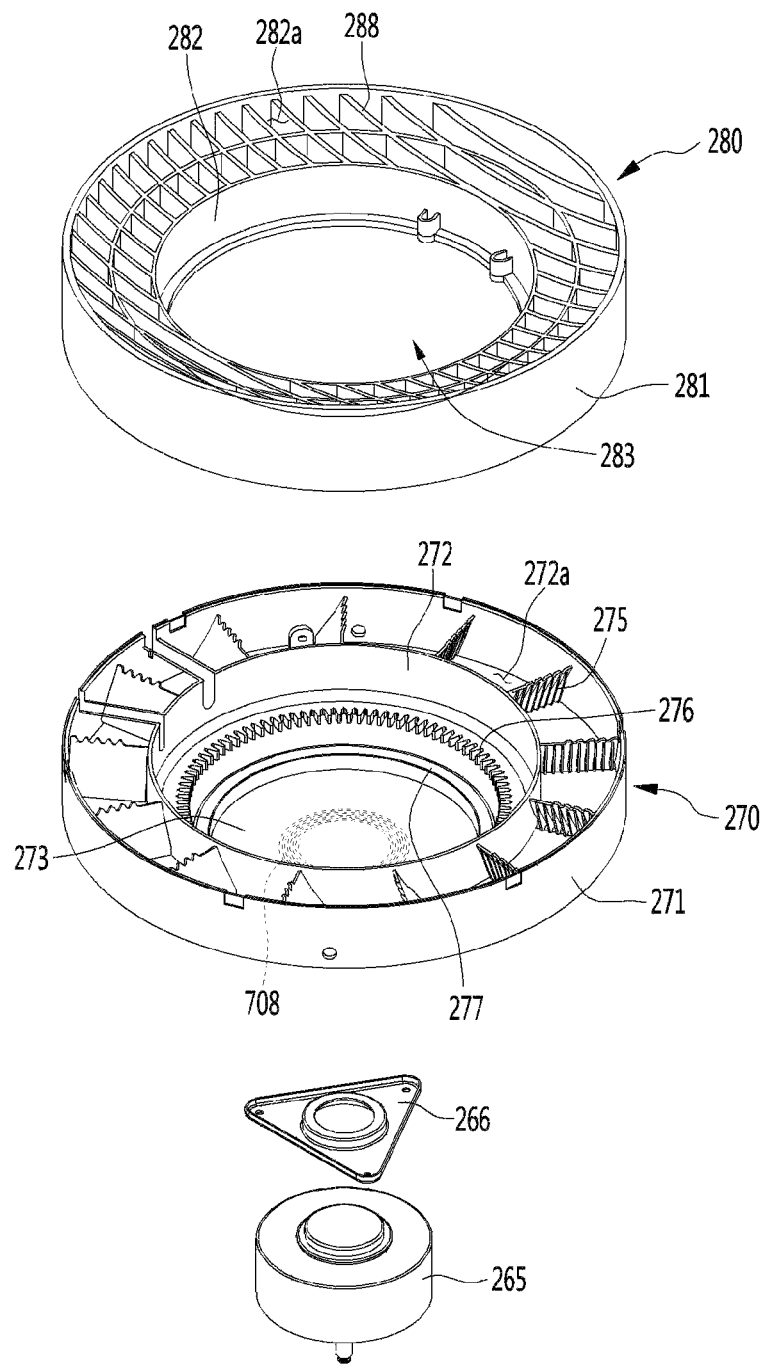

[FIG. 7]
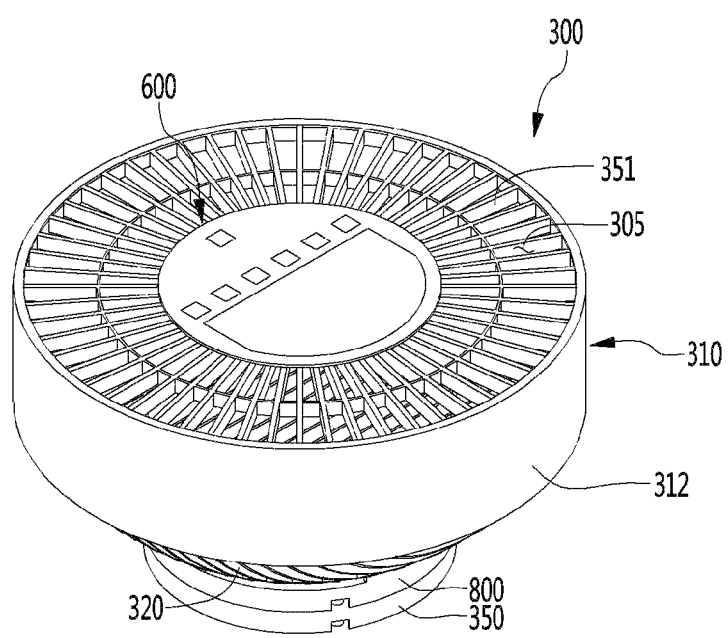

[FIG. 8]
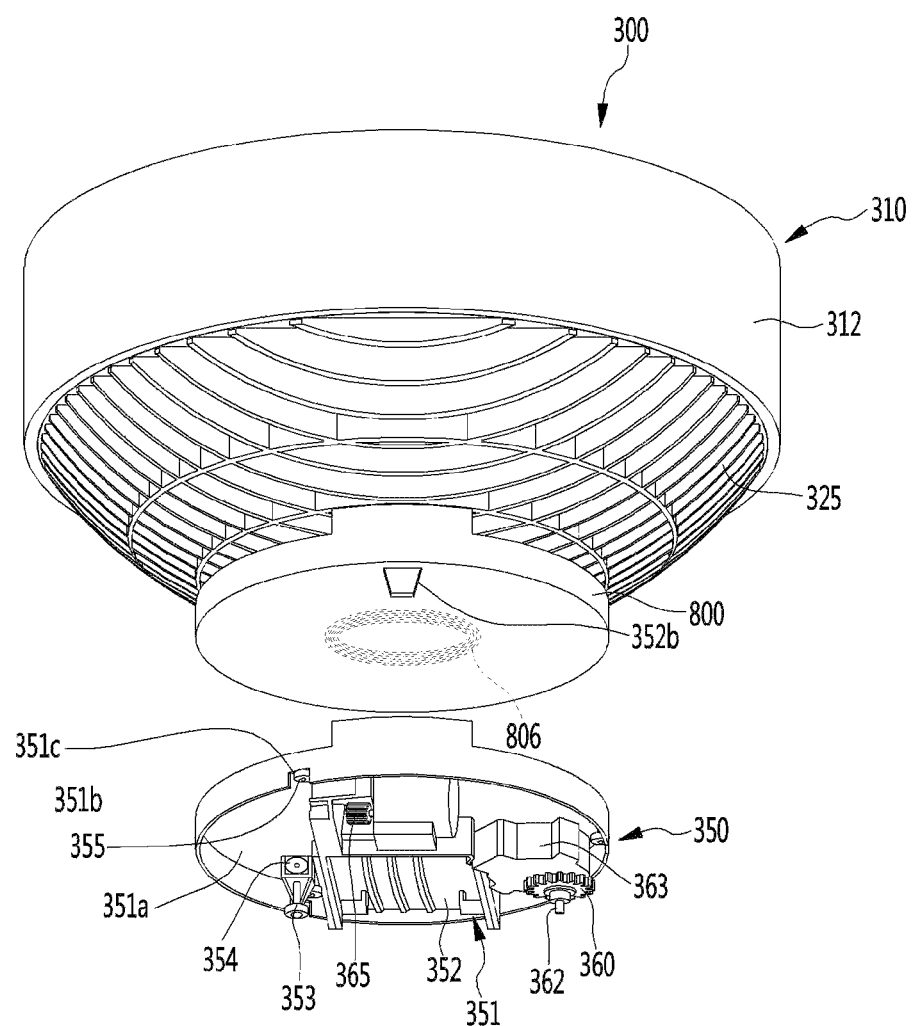

[FIG. 9]
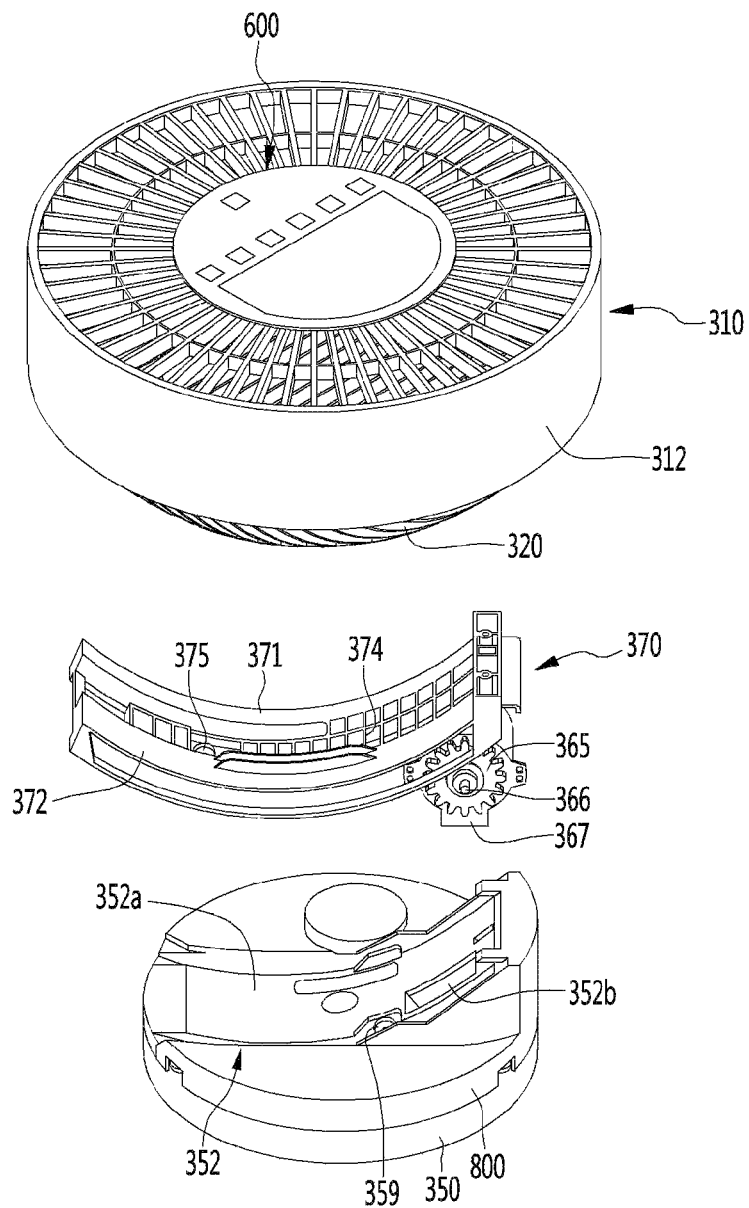

[FIG. 10]
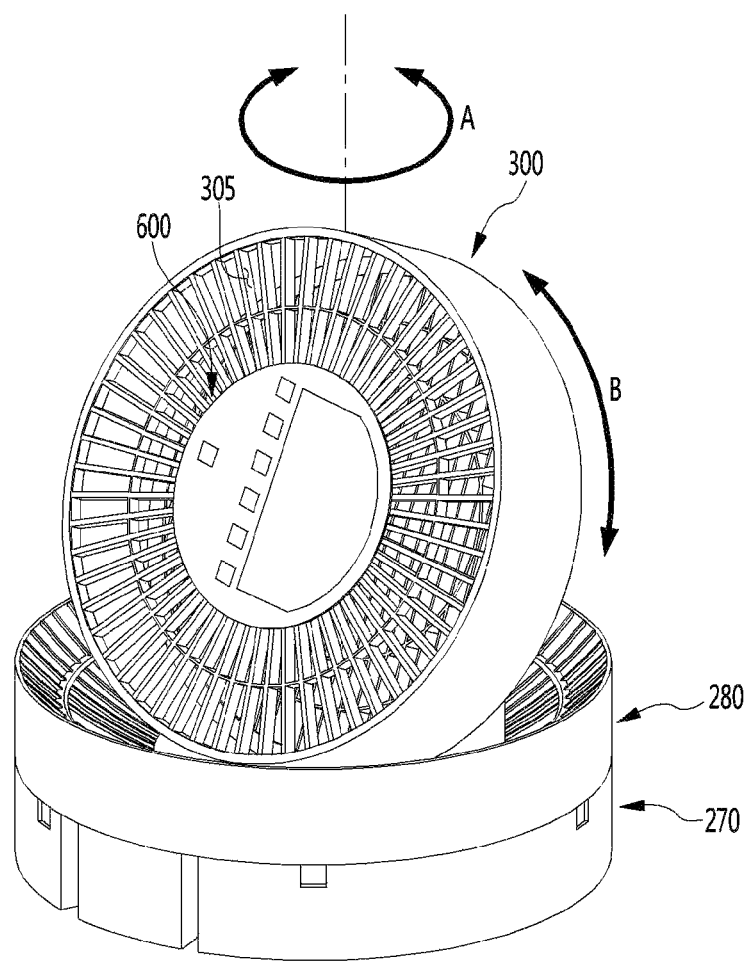

[FIG. 11]
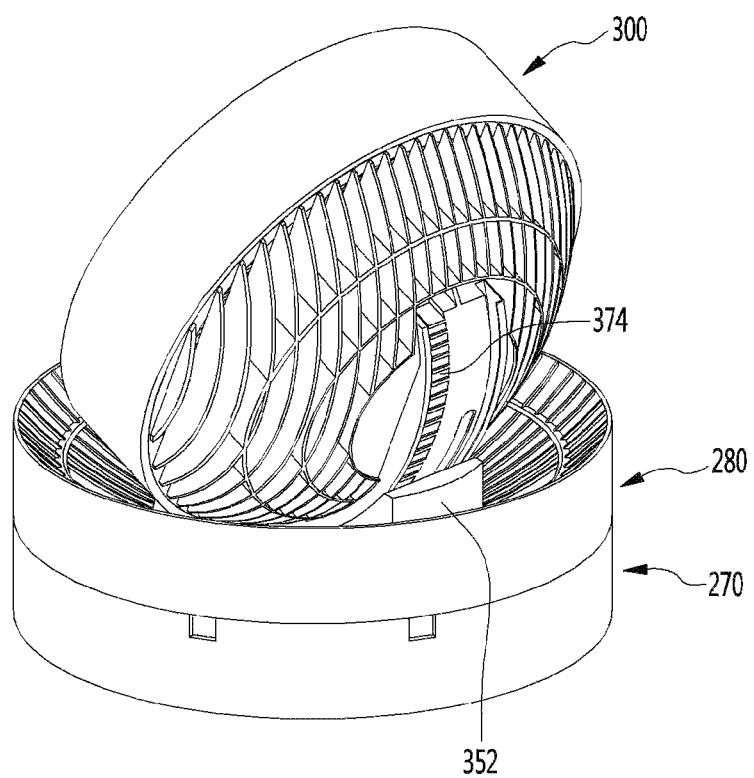

[FIG. 12]
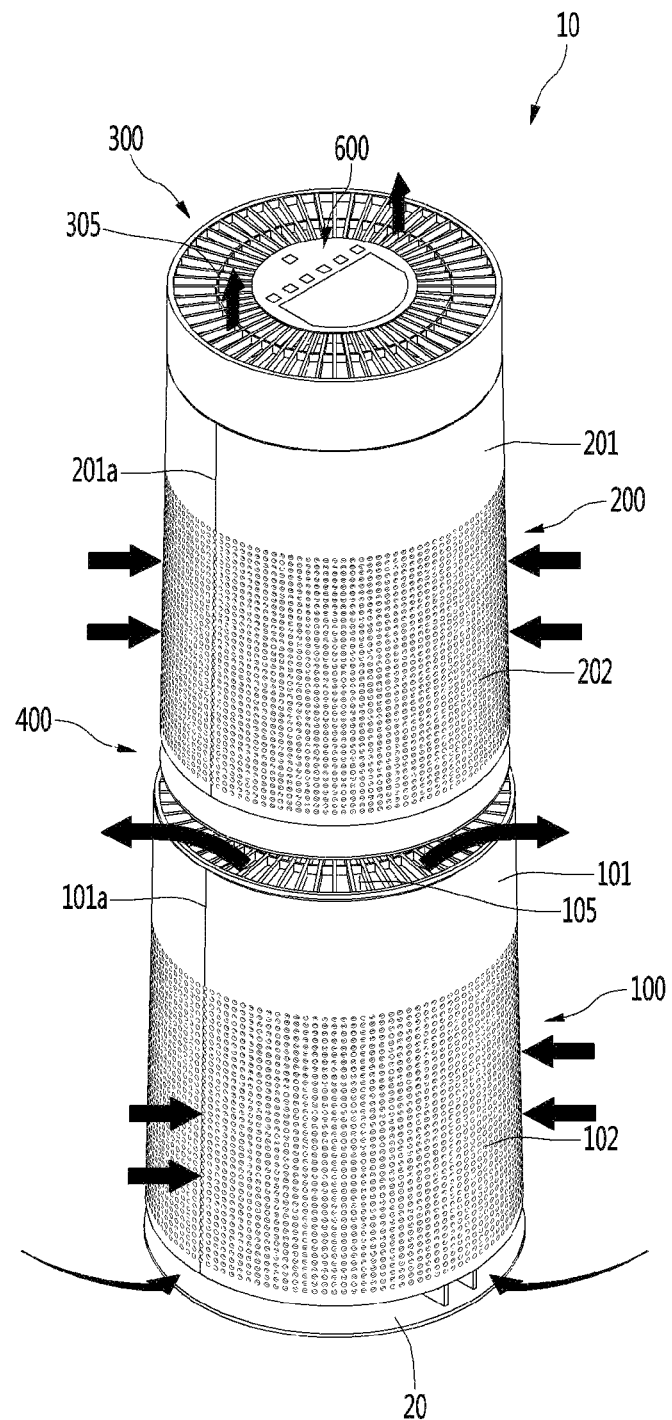

[FIG. 13]
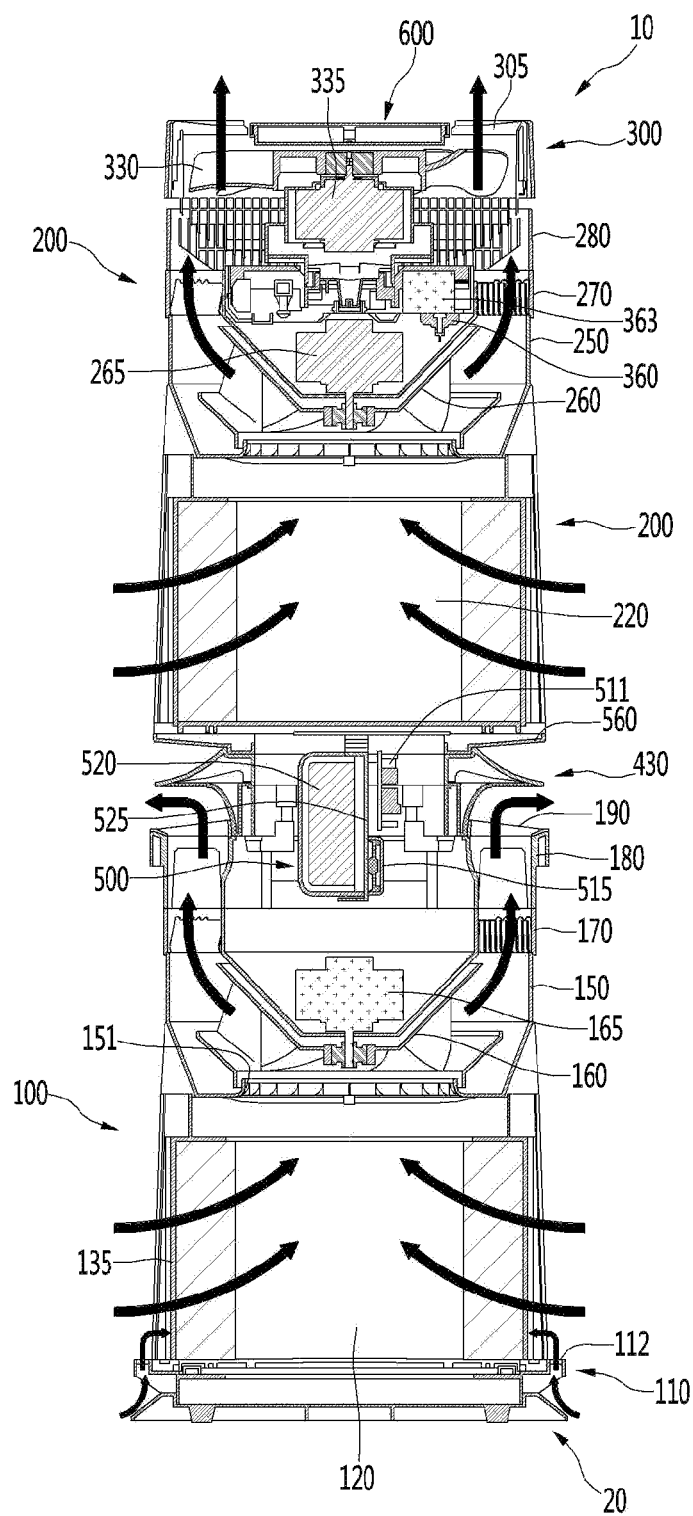

[FIG. 14]
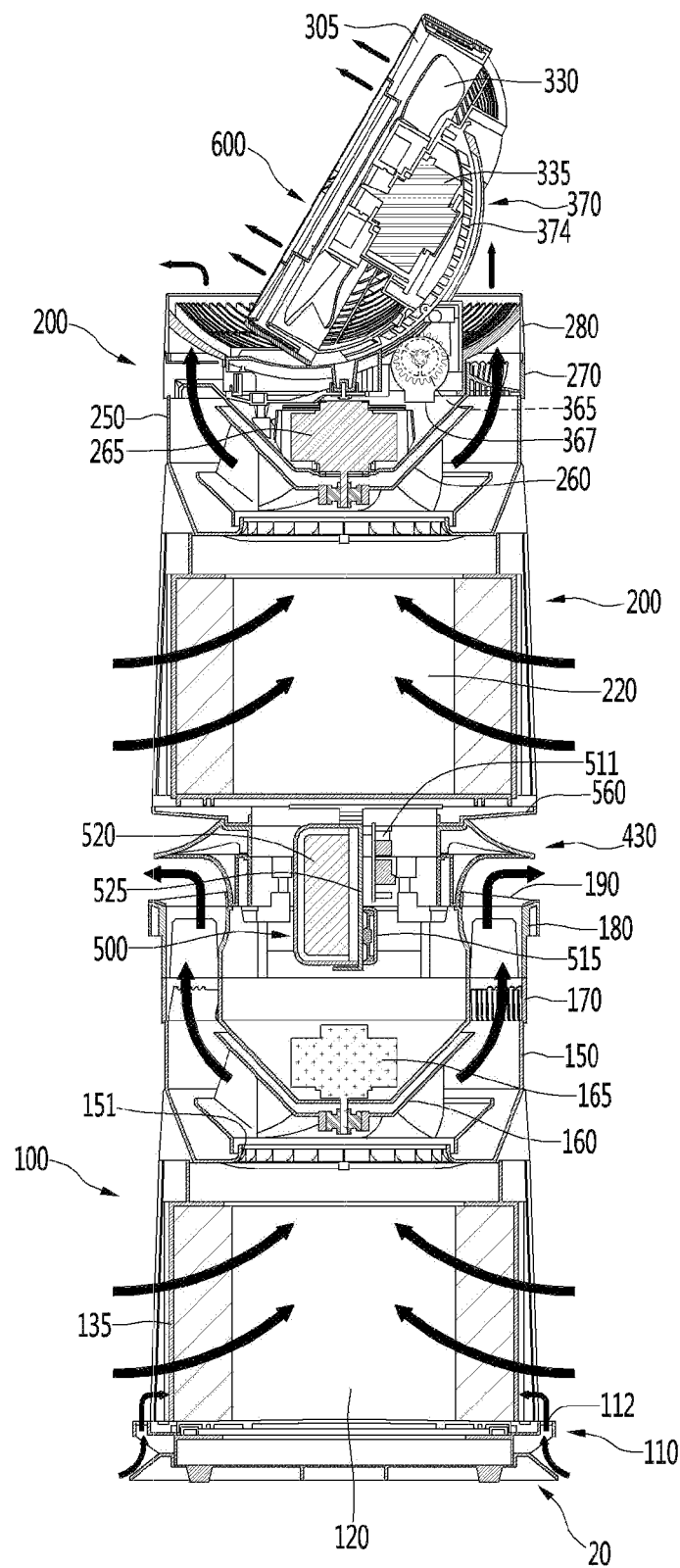

AIR CLEANER

CROSS-REFERENCE TO RELATED PATENT APPLICATIONS

This application is a U.S. National Stage Application under 35 U.S.C. § 371 of PCT Application No. PCT/KR2019/005336, filed May 3, 2019, which claims priority to Korean Patent Application No. 10-2019-0032599, filed Mar. 21, 2019, whose entire disclosures are hereby incorporated by reference.

TECHNICAL FIELD

The present disclosure relates to an air cleaner.

BACKGROUND

An air cleaner is understood as a device that sucks and purifies polluted air and discharges cleaned air. For example, the air cleaner may include an air blowing device for introducing external air into the air cleaner and a filter capable of filtering dust or bacteria in the air.

In general, an air cleaner is configured to purify an indoor space such as a home or an office. According to a conventional air cleaner, there is a problem in that the capacity of the air cleaner is limited, and thus air purification of an entire indoor space is limited. Therefore, while air around the air cleaner can be purified, there is a problem in that it is difficult to purify air in a space far away from the air cleaner.

In order to solve this problem, efforts have been made to improve the performance of a fan provided in the air cleaner. However, as the air blowing amount of the fan increases, a noise generated from the fan increases, thus deteriorating the reliability of the product.

In this regard, Korean Patent Publication No. 10-2018-0000121 (published on Jan. 2, 2018) discloses an air cleaner that includes a flow switching device at an upper side of an air blowing device to provide purified air to various spaces.

However, according to the prior patent document, the rotation angle of the flow switching device may be limited due to problems such as power connection between the flow switching device and the main body. Therefore, even though the flow switching device is provided, purified air is not smoothly provided to some spaces.

DISCLOSURE

Technical Problem

The present disclosure provides an air cleaner that allows a flow switching device provided at the upper side of an air blowing device to rotate 360 degrees.

The present disclosure provides an air cleaner capable of simplifying a process and a structure for power connection between an air blowing device and a flow switching device.

Technical Solution

An air cleaner according to an embodiment of the present disclosure includes a main body including a power supply and a wireless power transmitter connected to the power supply, and a flow switching device movably provided on one side of the main body, wherein the flow switching device includes a wireless power receiver configured to receive power wirelessly from the wireless power transmitter. Therefore, the movement limitation of the flow switching device due to electric wires or cables may be solved.

According to an embodiment, the flow switching device may be provided on the main body. In this case, a transmitting coil of the wireless power transmitter may be disposed above the main body, and a receiving coil of the wireless power receiver may be disposed under the flow switching device to face the transmitting coil.

The flow switching device may include a fan motor connected to a sub-fan and a display device provided thereon, wherein the fan motor and the display device may be electrically connected to the wireless power receiver.

The main body may include an air guide device disposed at an outlet side of a main fan, and a discharge guide device disposed at an outlet side of the air guide device.

The transmitting coil may be provided on the bottom surface of the air guide device.

The air guide device may include a first rack formed along an inner wall and geared to a first gear of the flow switching device. The flow switching device may include a first gear motor connected to the first gear and electrically connected to the wireless power receiver. Therefore, the first gear motor may rotate the first gear based on power supplied from the wireless power receiver, and the first gear may move along the first rack during the rotation of the first gear, thereby rotating the flow switching device 360 degrees.

The discharge guide device may have a through-hole formed therein, and the first gear may be geared to the first rack through the through-hole. In addition, since the guide body may be accommodated in the through-hole or accommodated in the inner wall of the air guide device, a portion of the flow switching device may be stably seated on the main body.

Advantageous Effects

According to embodiments of the present disclosure, an air cleaner is provided with a wireless power transmitter in an air blowing device and a wireless power receiver in a flow switching device, such that power can be supplied to the flow switching device in a wireless power transmission method. Therefore, electric wires or cables for power connection between the air blowing device and the flow switching device is removed, such that 360-degree rotation of the flow switching device is possible without twisting the electric wires or the cables.

In addition, by just arranging a transmitter included in the wireless power transmitter of the air blowing device and a receiver included in the wireless power receiver of the flow switching device to face each other, power connection between the air blowing device and the flow switching device becomes possible, thereby simplifying a process and a structure for power connection between the air blowing device and the flow switching device.

In addition, the air cleaner is provided with a discharge guide device in which the lower portion of the flow switching device is stably accommodated, thereby preventing the flow switching device from being separated during the 360-degree rotation of the flow switching device.

BRIEF DESCRIPTION OF DRAWINGS

FIG. 1 is a perspective view showing an outer appearance of an air cleaner according to an embodiment of the present disclosure.

FIG. 2 is a perspective view showing the inner configuration of the air cleaner according to an embodiment of the present disclosure.

FIG. 3 is a cross-sectional view taken along line III-III' of FIG. 2.

FIG. 4 is a conceptual diagram related to supply of power in the air cleaner according to an embodiment of the present disclosure.

FIG. 5 is a schematic block diagram showing the configuration of a wireless power transmitter and a wireless power receiver provided in the air cleaner according to an embodiment of the present disclosure.

FIG. 6 is an exploded perspective view showing the configuration of a third air guide device and a second discharge guide device according to an embodiment of the present disclosure.

FIG. 7 is a perspective view of a flow switching device according to an embodiment of the present disclosure.

FIG. 8 is an exploded perspective view of the flow switching device according to an embodiment of the present disclosure, when viewed from below.

FIG. 9 is an exploded perspective view of the flow switching device according to an embodiment of the present disclosure, when viewed from above.

FIGS. 10 and 11 are views showing a state in which the flow switching device according to an embodiment of the present disclosure is in a second position.

FIGS. 12 to 14 are views showing air flow in the air cleaner according to an embodiment of the present disclosure.

BEST MODE FOR CARRYING OUT THE INVENTION

Hereinafter, embodiments disclosed in the present specification will be described in detail with reference to the accompanying drawings. The accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

FIG. 1 is a perspective view illustrating an outer appearance of an air cleaner according to an embodiment of the present disclosure.

Referring to FIG. 1, an air cleaner 10 according to an embodiment of the present disclosure includes air blowers 100 and 200 configured to generate air flow, and a flow switching device 300 configured to switch a discharge direction of the air flow generated by the air blowers 100 and 200.

The air blowers 100 and 200 include a first air blower 100 configured to generate a first air flow and a second air blower 200 configured to generate a second air flow.

The first air blower 100 and the second air blower 200 may be arranged in a vertical direction. For example, the second air blower 200 may be disposed above the first air blower 100. In this case, the first air flow forms a flow for sucking indoor air existing on the lower side of the air cleaner 10, and the second air flow forms a flow for sucking indoor air existing on the upper side of the air cleaner 10.

The air cleaner 10 includes cases 101 and 201 that define an outer appearance.

In detail, the cases 101 and 201 include a first case 101 that defines the outer appearance of the first air blower 100. The first case 101 may have a cylindrical shape. The upper portion of the first case 101 may be configured to have a diameter less than that of the lower portion thereof. That is, the first case 101 may have a conical shape in which an end thereof is cut off.

The first case 101 includes a first separation part 101a to or from which two parts constituting the first case 101 are coupled or separated. The first case 101 further includes a hinge part (not shown) provided on an opposite side of the first separation part 101a. The two parts may rotate relative to the hinge part.

When at least one of the two parts rotates, the first case 101 may be opened and separated from the air cleaner 10. A locking device may be provided at a portion to which the two parts are coupled, that is, on the opposite side of the hinge part. The locking device may include a locking protrusion or a magnet member. By opening the first case 101, internal parts of the first air blower 100 may be replaced or repaired.

The first case 101 is provided with a first suction part 102 through which air is sucked. The first suction part 102 includes a through-hole defined in at least a portion of the first case 101. The first suction part 102 is formed in plurality.

The plurality of first suction parts 102 are uniformly formed along the outer circumferential surface of the first case 101 in the circumferential direction such that air may be sucked in any direction with respect to the first case 101. That is, air may be sucked in a 360-degree direction with respect to a vertical center line passing through the inner center of the first case 101.

As such, the first case 101 has a cylindrical shape and the plurality of first suction parts 102 are formed along the outer circumferential surface of the first case 101, thereby increasing the suction amount of air. As in the case of a conventional air cleaner, by avoiding a hexahedral shape having corners, it is possible to reduce a flow resistance with respect to the sucked air.

The air sucked through the first suction part 102 may flow in a substantially radial direction from the outer circumferential surface of the first case 101. The direction is defined. Referring to FIG. 1, the vertical direction is referred to as an axial direction, and the horizontal direction is referred to as a radial direction. The axial direction may correspond to the central axis direction of the first fan 160 and the second fan 260 to be described later, that is, the motor shaft direction of the fan. The radial direction may be understood as a direction perpendicular to the axial direction.

The circumferential direction is understood as a direction of an imaginary circle formed when the rotation is made about the axial direction and the distance in the radial direction is a rotation radius.

The first air blower 100 further includes a base 20 provided under the first case 101 and placed on the ground. The base 20 is spaced downward from the lower end of the first case 101. A base suction part 103 is formed in a space between the first case 101 and the base 20.

The air sucked through the base suction part 103 may flow upward through a suction part 112 of a suction grill (see 110 of FIG. 2) provided above the base 20.

That is, the first air blower 100 includes a plurality of suction parts 102 and 103. Air existing in the lower part of the indoor space may be easily introduced into the first air blower 100 through the plurality of suction parts 102 and 103. Accordingly, the suction amount of air may be increased.

A first discharge part 105 is defined at the upper portion of the first air blower 100. The first discharge part 105 may be defined in a first outlet grill 195 of a first discharge guide device (see 190 of FIG. 2) provided in the first air blower 100. The first discharge guide device 190 defines the outer appearance of the upper end of the first air blower 100. Air discharged through the first discharge part 105 may flow upward in the axial direction.

The cases 101 and 201 include a second case 201 that defines the outer appearance of the second air blower 200. The second case 201 may have a cylindrical shape. The upper portion of the second case 201 may be configured to have a diameter less than that of the lower portion thereof. That is, the second case 201 may have a conical shape in which an end thereof is cut off.

The second case 201 includes a hinge part and two parts to or from may be coupled or separated through a second separation part 201a. The second case 201 may be configured to be openable like the first case 101. The detailed description of the first case 101 may be equally applied to the second case 201. By opening the second case 201, internal parts of the second air blower 200 may be replaced or repaired.

The diameter of the lower end of the second case 201 may be less than the diameter of the upper end of the first case 101. Therefore, in view of the overall shape of the cases 101 and 201, the lower cross-sectional areas of the cases 101 and 201 are formed to be greater than the upper cross-sectional areas thereof, so that the air cleaner 10 can be stably supported on the ground.

The second case 201 is provided with a second suction part 202 through which air is sucked. The second suction part 202 includes a through-hole defined in at least a portion of the second case 201. The second suction part 202 is formed in plurality.

The plurality of second suction parts 202 are uniformly formed along the outer circumferential surface of the second case 201 in the circumferential direction such that air may be sucked in any direction with respect to the second case 201. That is, air may be sucked in a 360-degree direction with respect to a vertical center line passing through the inner center of the second case 201.

As such, the second case 201 has a cylindrical shape and the plurality of second suction parts 202 are formed along the outer circumferential surface of the second case 201, thereby increasing the suction amount of air. As in the case of a conventional air cleaner, by avoiding a hexahedral shape having corners, it is possible to reduce a flow resistance with respect to the sucked air.

The air sucked through the second suction part 202 may flow in a substantially radial direction from the outer circumferential surface of the second case 201.

The air cleaner 10 includes a partition device 400 provided between the first air blower 100 and the second air blower 200. Due to the partition device 400, the second air blower 200 may be spaced apart from the upper side of the first air blower 100.

The flow switching device 300 may be provided above the second air blower 200. Based on the air flow, the air passage of the second air blower 200 may communicate with the air passage of the flow switching device 300. The air passing through the second air blower 200 may pass through the air passage of the flow switching device 300 and may be discharged to the outside through the second discharge part 305. The second discharge part 305 is defined at the upper end of the flow switching device 300.

The flow switching device 300 may be movably provided. In detail, as shown in FIG. 1, the flow switching device 300 may be in a lying state (first position) or in an inclined erected state (second position).

A display device 600 configured to display operation information of the air cleaner 10 is provided above the flow switching device 300. The display device 600 may move together with the flow switching device 300.

FIG. 2 is a perspective view showing the inner configuration of the air cleaner according to an embodiment of the present disclosure, and FIG. 3 is a cross-sectional view taken along line III-III' of FIG. 2.

Referring to FIGS. 2 and 3, the first air blower 100 according to an embodiment of the present disclosure includes a base 20 and a suction grill 110 disposed above the base 20.

The base 20 includes a base body 21 placed on the ground, and a base protrusion part 22 which protrudes upward from the base body 21 and on which the suction grill 110 is placed. The base protrusion part 22 may be provided on both sides of the base 20.

Due to the base protrusion part 22, the base body 21 and the suction grill 110 are spaced apart from each other. The base suction part 103 defining an air suction space is formed between the base 20 and the suction grill 110.

The suction grill 110 includes a grill body 111 having a substantially ring shape, and a rim part protruding upward from the outer circumferential surface of the grill body 111. Due to the configuration of the grill body 111 and the rim part, the suction grill 110 may have a stepped shape.

The suction grill 110 includes a suction part 112 defined in the rim part. The suction part 112 may be configured to protrude upward along the circumference of the rim part, and may be configured to extend in the circumferential direction. A plurality of suction holes 112a are defined inside the suction part 112. The plurality of suction holes 112a may communicate with the base suction part 103.

Air sucked through the plurality of suction holes 112a and the base suction part 103 may pass through a first filter member 120. The first filter member 120 has a cylindrical shape and may have a filter surface for filtering air. The air passing through the plurality of suction holes 112a may pass through the outer circumferential surface of the first filter member 120 having the cylindrical shape and may be introduced thereinto.

The first air blower 100 further includes a first filter frame 130 defining a mounting space for the first filter member 120. In detail, the first filter frame 130 includes a first frame 131 defining the lower portion of the first filter frame 130, and a second frame 132 defining the upper portion of the first filter frame 130. The first and second frames 131 and 132 may have a substantially ring shape.

The first filter frame 130 further includes a first filter support part 135 extending upward from the first frame 131 toward the second frame 132. A plurality of first filter support parts 135 may be provided, and the plurality of first filter support parts 135 may be arranged in a circumferential direction and connected to rim parts of the first and second frames 131 and 132.

The mounting space for the first filter member 120 is defined by the first and second frames 131 and 132 and the plurality of first filter support parts 135. A first support cover 136 may be coupled to the outside of the first filter support part 135.

A sensor device 137 may be provided in the first filter frame 130. The sensor device 137 may include a dust sensor configured to detect the amount of dust in the air and a gas sensor configured to detect the amount of gas in the air. The dust sensor and the gas sensor may be supported by the second frame 132 of the first filter frame 130.

In the mounting space, the first filter member 120 may be detachably mounted. The first filter member 120 has a cylindrical shape, and air may be introduced through the outer circumferential surface of the first filter member 120. In the process of passing through the first filter member 120, impurities such as fine dust in the air may be filtered out.

Since the first filter member 120 has a cylindrical shape, air can be introduced from any direction with respect to the first filter member 120. Therefore, the air filtering area can be increased.

The mounting space may have a cylindrical shape corresponding to the shape of the first filter member 120. The first filter member 120 may be slidably mounted toward the mounting space during the mounting process. In contrast, the first filter member 120 may be slidably separated from the mounting space during the separation process.

The first air blower 100 further includes a first fan housing 150 provided at the outlet side of the first filter member 120. A housing space part 152 in which the first fan 160 is accommodated is defined in the first fan housing 150. The first fan housing 150 may be supported by the first filter frame 130.

The first fan housing 150 is provided with a first fan inlet part 151 at the lower portion of the first fan housing 150 to guide air to flow into the first fan housing 150. The first fan inlet part 151 is provided with a grill, and when the first filter member 150 is separated, it is possible to prevent a user from inserting his or her finger or the like into the first fan housing 150.

The first air blower 100 further includes an ionizer configured to remove or sterilize odor particles in the air. The ionizer is coupled to the first fan housing 150, and may act on air flowing inside the first fan housing 150.

The sensor device 137 and the ionizer may also be provided in the second air blower 200 to be described later. As another example, the sensor device 137 and the ionizer may be provided in one of the first air blower 100 and the second air blower 200.

The first fan 160 is placed above the first fan inlet part 151. For example, the first fan 160 includes a centrifugal fan configured to suck air in an axial direction and discharge air upward in a radial direction.

In detail, the first fan 160 includes a hub 161 to which a rotation shaft 165a of a first fan motor 165, which is a centrifugal fan motor, is coupled, a shroud 162 spaced apart from the hub 161, and a plurality of blades 163 disposed between the hub 161 and the shroud 162. The first fan motor 165 may be coupled to the upper side of the first fan 160.

The hub 161 may have a bowl shape in which a diameter becomes narrower in a downward direction. The hub 161 includes a shaft coupling part to which the rotation shaft 165a is coupled, and a first blade coupling part extending obliquely upward from the shaft coupling part.

The shroud 162 includes a lower end where a shroud inlet through which air passing through the first fan inlet part 151 is sucked is formed, and a second blade coupling part extending upward from the lower end.

One surface of the blade 163 may be coupled to the first blade coupling part of the hub 161, and the other surface of the blade 163 may be coupled to the second blade coupling part of the shroud 162. The plurality of blades 163 may be spaced apart from each other in the circumferential direction of the hub 161.

The first air blower 100 further includes a first air guide device 170 coupled to the upper side of the first fan 160 to guide the flow of air passing through the first fan 160.

The first air guide device 170 includes an outer wall 171 having a cylindrical shape and an inner wall 172 positioned inside the outer wall 171 and having a cylindrical shape. The outer wall 171 is disposed to surround the inner wall 172. A first air passage through which air flows is defined between the inner circumferential surface of the outer wall 171 and the outer circumferential surface of the inner wall 172.

The first air guide device 170 includes a guide rib 175 disposed in the first air passage. The guide rib 175 extends from the outer circumferential surface of the inner wall 172 to the inner circumferential surface of the outer wall 171. A plurality of guide ribs 175 may be spaced apart from each other. The plurality of guide ribs 175 serve to upwardly guide the air introduced into the first air passage of the first air guide device 170 through the first fan 160.

The guide rib 175 may extend obliquely upward from the lower portions of the outer wall 171 and the inner wall 172. For example, the guide rib 175 is formed to be round, and guides air to flow obliquely upward.

The first air guide device 170 further includes a motor accommodation part 173 extending downward from the inner wall 172 to accommodate the first fan motor 165. The motor accommodation part 173 may have a bowl shape in which a diameter decreases toward a lower side. The shape of the motor accommodation part 173 may correspond to the shape of the hub 161. The motor accommodation part 173 may be inserted into the hub 161.

The first fan motor 165 may be supported on the upper side of the motor accommodation part 173. The rotation shaft 165a of the first fan motor 165 may extend downward from the first fan motor 165 and may be coupled to the shaft coupling part of the hub 161 through the bottom of the motor accommodation part 173.

The first air blower 100 further includes a second air guide device 180 coupled to the upper side of the first air guide device 170 to guide air passing through the first air guide device 170 to the first discharge guide device 190.

The second air guide device 180 includes a first guide wall 181 having a substantially cylindrical shape, and a second guide wall 182 disposed inside the first guide wall 181 and having a substantially cylindrical shape. The first guide wall 181 may be disposed to surround the second guide wall 182.

A second air passage through which air flows is defined between the inner circumferential surface of the first guide wall 181 and the outer circumferential surface of the second guide wall 182. The air flowing through the first air passage of the first air guide device 170 passes through the second air passage and flows upward. The second air passage 185 may be referred to as a "discharge passage". The first discharge part 105 is disposed above the second air passage.

A first space part in which at least a portion of a printed circuit board (PCB) device 500 is accommodated is defined inside the second guide wall 182 having a cylindrical shape. The PCB device includes a power supply 520 and a main PCB 511.

The power supply 520 is understood as a device that receives commercial power supplied from a power cable connected to the air cleaner 10 and supplies the power to a plurality of components in the main PCB 511 and the air cleaner 10. The power supply 520 may include a PCB for AC power (power PCB).

The main PCB 511 may include a PCB for DC power driven by a DC voltage converted in the PCB for AC power.

The PCB device 500 further includes a PCB support plate 525 that supports the power supply 520 and the main PCB 511. The main PCB 511 may be supported on one surface of the PCB support plate 525, and the power supply 520 may be supported on the other surface of the PCB support plate 525.

The PCB device includes a communication module 515 through which the air cleaner 10 can communicate with an external device. For example, the communication module 515 may include a Wi-Fi module. The communication module 515 may be supported on the PCB support plate 525, and may be disposed below the main PCB 511.

The first air blower 100 further includes a first discharge guide device 190 which is disposed on the upper side of the second air guide device 180, that is, on the outlet side of the air passage passing through the second air guide device 180 based on the air passage, and guides the discharge of air to the outside of the air cleaner 10. A first discharge part 105 through which air is discharged is defined in the first discharge guide device 190.

The second air blower 200 includes a second filter member 220, a second filter frame 230, a second fan housing 250, a second fan 260, and a support device 560.

The second filter member 220 may have a cylindrical shape in which an upper portion is opened. The second filter member 220 includes a filter body having a filter part of an empty cylindrical shape, and a filter hole defined at an upper end portion of the filter body. Air may flow into the inner side of the filter body through the outer circumferential surface of the filter body, and may be discharged from the second filter member 220 through the filter hole. The configuration of the second filter member 220 may also be used in the first filter member 120.

The second air blower 200 further includes a second filter frame 230 defining a mounting space for the second filter member 220.

The mounting space may have a cylindrical shape corresponding to the shape of the second filter member 220. The second filter member 220 may be slidably mounted toward the mounting space during the mounting process. In contrast, the second filter member 220 may be slidably separated from the mounting space during the separation process.

The second air blower 200 further includes a second fan housing 250 provided at the outlet side of the second filter member 220. The second fan housing 250 is provided with an accommodation space in which the second fan 260 is accommodated. Since the configuration of the second fan housing 250 and the second fan 260 is the same as that of the first fan housing 150 and the first fan 160, the description of the first fan housing 150 and the first fan 160 is equally applied to the second fan housing 250 and the second fan 260.

The second air blower further includes a support device 560 that supports the second filter member 220. The support device 560 has a substantially annular shape. The support device 560 includes a third space part defining an installation space in which the PCB device 500 can be positioned. The third space part is defined in a substantially central portion of the support device 560.

On the other hand, the second air blower 200 further includes a third air guide device 270 coupled to the upper side of the second fan 260 to guide the flow of air passing through the second fan 260. In addition, the second air blower 200 further include a second discharge guide device 280 provided on the upper side of the third air guide device 270 to guide the flow of air passing through the third air guide device 270. In addition, the flow switching device 300 may be provided above the second air blower 200. The air guide device 270, the second discharge guide device 280, and the flow switching device 300 will be described in more detail later with reference to FIGS. 6 to 11.

A partition device 400 is provided between the first air blower 100 and the second air blower 200. The partition device 400 includes a partition plate 430 that separates or blocks air flow generated by the first air blower 100 and air flow generated by the second air blower 200. Due to the partition plate 430, the first and second air blowers 100 and 200 may be vertically spaced apart from each other.

That is, a separation space in which the partition plate 430 is positioned is defined between the first and second air blowers 100 and 200. The first discharge guide device 190 of the first air blower 100 may be positioned at the lower end portion of the separation space, and the support device 560 of the second air blower 200 may be positioned at the upper end portion of the separation space.

The separation space may be divided into an upper space and a lower space by the partition plate 430. The lower space is understood as a first space part 448 through which air discharged from the first discharge part 105 of the first discharge guide device 190 flows to the outside of the air cleaner 10. The upper space constitutes a second space part 458 as a holding space in which a user can put his or her hand when moving the air cleaner 10.

The air discharged from the first discharge part 105 is guided by the partition plate 430 to flow to the outside of the air cleaner 10. Therefore, it is possible to prevent the air from flowing into the second air blower 200.

FIG. 4 is a conceptual diagram related to supply of power in the air cleaner according to an embodiment of the present disclosure.

In the following drawings, for convenience of description, the first air blower 100 and the second air blower 200 are collectively referred to as a main body 100+200.

Referring to FIG. 4, the power supply 520 of the air cleaner 10 may be connected to an external commercial power source and supplied with power. The power supply 520 may provide the supplied power to components in the air cleaner 10.

Specifically, the power supply 520 may supply power to the first fan motor 165, the second fan motor 265, and the main PCB 511 provided in the main body 100+200. For example, the first fan motor 165, the second fan motor 265, and the main PCB 511 may be connected to the power supply 520 through cables and supplied with power.

In addition, the power supply 520 may also supply power to the third fan motor 335, the first gear motor 363, the second gear motor 367, and the display device 600 provided in the flow switching device 300.

On the other hand, as will be described later, the flow switching device 300 may be rotated in the left-and-right direction. In particular, the flow switching device 300 may be implemented to rotate 360 degrees to discharge the purified air to various areas around the air cleaner 10.

At this time, when the power connection between the components of the power supply 520 and the flow switching device 300 is made through cables, the cables may be twisted according to the 360-degree rotation of the flow switching device 300. In this case, due to the damage to the cables or the like, power may not be smoothly supplied to the components of the flow switching device 300.

Alternatively, the air cleaner 10 may have an additional structure for preventing the cables from being twisted. However, as the structure is provided, the process of manufacturing the air cleaner 10 may become complicated.

The air cleaner 10 according to an embodiment of the present disclosure may include a wireless power transmitter 700 provided above the main body 100+200 and connected to the power supply 520, and a wireless power receiver 800 provided under the flow switching device 300 and disposed to face the wireless power transmitter 700. The power supply 520 may supply power to the wireless power transmitter 700, and thus power may be supplied to the components included in the flow switching device 300 through a wireless power transmission method.

Although not shown, when the power supply 520 is provided in the first air blower 100, power may also be supplied between the first air blower 100 and the second air blower 200 through a wireless power transmission method. For example, the wireless power transmitter may be provided in the second air guide device 180 of the first air blower 100, and the wireless power receiver may be provided under the second filter member 220 of the second air blower 200. In this case, the second fan motor 265 of the second air blower 200 may be connected to the wireless power receiver and supplied with power from the wireless power receiver. In addition, the wireless power receiver may be connected to the wireless power transmitter 700 to provide power to the wireless power receiver 800 of the flow switching device 300 through the wireless power transmitter 700.

The wireless power transmitter 700 and the wireless power receiver 800 will be described below with reference to FIG. 5.

FIG. 5 is a schematic block diagram illustrating the configuration of the wireless power transmitter and the wireless power receiver provided in the air cleaner according to an embodiment of the present disclosure.

The wireless power transmitter 700 and the wireless power receiver 800 may transmit or receive power according to various wireless power transmission methods such as a magnetic induction method or a magnetic resonance method.

The magnetic induction method is a method using an electromagnetic induction phenomenon in which a voltage is induced to allow a current to flow when a magnetic field is changed around a conductor through which electricity flows.

In the magnetic resonance method, when a transmitter and a receiver resonate at the same frequency, power may be transmitted according to wireless power transmission in which an electromagnetic wave moves from the transmitter to the receiver through an electromagnetic field. A transmitting coil of the transmitter may have a certain resonant frequency, and may generate an electromagnetic wave and a magnetic field as power is supplied. At this time, induction power may be generated in a receiving coil of the receiver by the magnetic field.

That is, in the present specification, the transmission of power from the wireless power transmitter 700 to the wireless power receiver 800 means that induced power is generated in the receiver 806 of the wireless power receiver 800 by the magnetic field generated by the transmitter 708 of the wireless power transmitter 700.

Referring to FIG. 5, the wireless power transmitter 700 may include a microcomputer 702, a memory 704, an oscillator 706, and a transmitter 708. As described above, the wireless power transmitter 700 may be provided on the main body 100+200, specifically, on the upper side of the second air blower 200.

The microcomputer 702 may control overall operations of the wireless power transmitter 700. For example, the microcomputer 702 may receive a control command for transmitting power from a controller 512 provided on a main PCB 511, and control the oscillator 706 according to the received control command, so that power may be transmitted to the wireless power receiver 800.

The memory 704 may store control data related to operations of components included in the wireless power transmitter 700.

The oscillator 706 may provide AC power to the transmitter 708 by using power supplied from the power supply 520 under the control of the microcomputer 702. For example, the oscillator 706 may maximize the efficiency of supply of power by controlling the frequency of the power provided to the transmitter 708 as the resonant frequency.

The transmitter 708 may supply power to the wireless power receiver 800 based on the AC power provided by the oscillator 706. For example, the transmitter 708 may include a transmitting coil that generates a magnetic field when the AC power is provided, but the present disclosure is not limited thereto.

On the other hand, the wireless power transmitter 700 may include only the oscillator 706 and the transmitter 708. In this case, overall operations of the wireless power transmitter 700 may be controlled by the controller 512. In addition, control data related to the operation of the wireless power transmitter 700 may be stored in the memory of the main PCB 511.

The wireless power receiver 800 may include a microcomputer 802, a memory 804, a receiver 806, and a rectifier 808. As described above, the wireless power receiver 800 may be provided under the flow switching device 300.

The microcomputer 802 may control overall operations of the wireless power receiver 800. For example, when AC power corresponding to the power received through the receiver 806 is rectified by the rectifier 808, the microcomputer 802 may supply the rectified power to the components 335, 363, 367, and 600 included in the flow switching device 300.

The memory 804 may store control data related to operations of components included in the wireless power receiver 800.

The receiver 806 may receive power from the transmitter 708. For example, the receiver 806 may include a receiving coil that generates induction power based on a magnetic field generated by the transmitter 708, but the present disclosure is not limited thereto.

The rectifier 808 may rectify AC power corresponding to the induction power generated from the receiver 806.

On the other hand, the wireless power receiver 800 may include only the receiver 806 and the rectifier 808. In this case, the power supplied through the receiver 806 may be rectified by the rectifier 808 and then provided directly to the components 335, 363, 367, and 600.

That is, since the air cleaner according to an embodiment of the present disclosure includes the wireless power transmitter 700 and the wireless power receiver 800, the cable between the main body 100+200 and the flow switching device 300 may be removed. Therefore, since the twisting phenomenon of the cable according to the rotation of the flow switching device 300 is removed, 360-degree rotation of the flow switching device 300 may be easily implemented.

Hereinafter, the structure related to the 360-degree rotation of the flow switching device 300 and a detailed implementation example of the wireless power transmitter 700 and the wireless power transmitter 800 will be described with reference to the drawings.

FIG. 6 is an exploded perspective view showing the configuration of a third air guide device and a second discharge guide device according to an embodiment of the present disclosure, FIG. 7 is a perspective view of the flow switching device according to an embodiment of the present disclosure, and FIG. 8 is an exploded perspective view of the flow switching device according to an embodiment of the present disclosure, when viewed from below.

Referring to FIGS. 6 to 8, the second air blower 220 according to an embodiment of the present disclosure further includes a third air guide device 270 coupled to the upper side of the second fan 260 to guide the flow of air passing through the second fan 260.

The third air guide device 270 includes an outer wall 271 defining the outer circumferential surface of the third air guide device 270, and an inner wall 272 positioned inside the outer wall 271 and defining the inner circumferential surface of the third air guide device 270. A first air passage 272a through which air flows is defined between the inner circumferential surface of the outer wall 271 and the outer circumferential surface of the inner wall 272.

The third air guide device 270 includes a guide rib 275 disposed in the first air passage 272a. The guide rib 275 extends from the outer circumferential surface of the inner wall 272 to the inner circumferential surface of the outer wall 271.

The third air guide device 270 has a bottom surface 273 formed inward from the lower side of the inner wall 272. A second fan motor 265 may be coupled and fixed to the bottom of the bottom surface 273. The second fan motor 265 is coupled to the upper side of the second fan 260 to provide a driving force to the second fan 260. A motor coupling part 266 is provided on one side of the second fan motor 265, and the motor coupling part 266 guides the second fan motor 265 to be fixed to the third air guide device 270.

In addition, the transmitter 708 of the wireless power transmitter 700 described above with reference to FIGS. 4 and 5 may be provided inside the bottom surface 273 or on the bottom surface 273. For example, the transmitter 708 may be implemented as a transmitting coil, and the transmitting coil may be formed in a shape corresponding to the bottom surface 273.

The third air guide device 270 includes guide devices 276 and 277 configured to guide the movement of the flow switching device 300. The guide devices 276 and 277 include a first rack 276 provided on the inner wall 272, and a shaft guide groove 277 provided on the inner wall 272 or the bottom surface 273.

The first rack 276 is understood as a configuration for guiding the left-and-right rotation of the flow switching device 300 while interlocking with the first gear 360 of the flow switching device 300. The first rack 276 may be provided to protrude from the inner wall 272 to the center of the third air guide device 270. The first rack 276 may be formed along the inner wall 272 in a ring shape.

The flow switching device 300 may be rotated in the left-and-right direction. The term "rotation in the left-and-right direction" may refer to clockwise or counterclockwise rotation with respect to the vertical direction. In this process, the first gear 360 may rotate with a certain rotation radius around the rotation shaft 354 of the flow switching device 300.

The shaft guide groove 277 is a groove for guiding the rotation of the first gear 360 and is understood as a configuration that extends to be round with a certain curvature. For example, the shaft guide groove 277 may be formed to be round in the circumferential direction. That is, the shaft guide groove 277 may have a ring shape.

A first gear shaft 362 of the first gear 360 may be inserted into the shaft guide groove 277. While the first gear 360 is rotating, the first gear shaft 362 may move along the shaft guide groove 277.

The second air blower 200 is provided with a second discharge guide device 280 provided above the third air guide device 270 to guide the flow of air passing through the third air guide device 270.

The second discharge guide device 280 may have a substantially annular shape. In detail, the second discharge guide device 280 includes a discharge outer wall 281 defining the outer circumferential surface of the second discharge guide device 280 and having a cylindrical shape, and a discharge inner wall 282 positioned inside the discharge outer wall 281, defining the inner circumferential surface of the second discharge guide device 280, and having a cylindrical shape.

The discharge outer wall 281 is disposed to surround the discharge inner wall 282. A second air passage 282a, that is, a discharge passage, which forms the flow of air passing through the third air guide device 270 through which air flows, is defined between the inner circumferential surface of the discharge outer wall 281 and the outer circumferential surface of the discharge inner wall 282. The discharge passage may be positioned above the first air passage 272a provided with the guide rib 275.

The second discharge guide device 280 further includes a second outlet grill 288 disposed in the discharge passage 282a. The second outlet grill 288 extends from the outer circumferential surface of the discharge inner wall 282 to the inner circumferential surface of the discharge outer wall 281. The second outlet grill 288 may prevent a user from inserting his or her finger into the lower side of the discharge passage 282a.

An accommodation space 283 in which at least a portion of the rotation guide device 350 of the flow switching device 300 and the wireless power receiver 800 is accommodated is defined in the second discharge guide device 280. The accommodation space 283 has a shape of a through-hole penetrating the second discharge guide device 280 in the vertical direction. Therefore, the first gear 360 of the rotation guide device 350 may be geared to the first rack 276 through the accommodation space 283.

Referring to FIGS. 3 and 7, the flow switching device 300 includes a third fan housing 310 in which the third fan 330 is accommodated. The third fan housing 310 has a substantially annular shape. In detail, the third fan housing 310 includes a housing cover 312 defining an outer appearance.

For convenience of description, the first fan 160 and the second fan 260 may be referred to as a "main fan" and the third fan 330 may be referred to as a "sub-fan". In other words, the first and second fans 160 and 260 may be referred to as a "blowing fan" and the third fan 330 may be referred to as a "flow switching fan".

The third fan 330 is accommodated in the housing cover 312. A housing passage through which air flows by driving the third fan 330 is defined in the inner space of the housing cover 312. A blade of the third fan 330 may be positioned in the housing passage. Due to the rotation of the blade, air may flow upward through the housing passage. The housing passage may extend from a space in which the blade is positioned to a space above the blade.

A second discharge part 305 through which air passing through the third fan 330 is discharged is defined on the upper side of the third fan housing 310.

Since the air cleaner 10 is provided with the second discharge part 305 together with the first discharge part 105 of the first air blower 100, the air volume is improved and the air is discharged in various directions.

The third fan 330 may include an axial flow fan. In detail, the third fan 330 may be operated to axially discharge air introduced in the axial direction. That is, the air flowing upward toward the third fan 330 through the second fan 260, the first air passage 272a of the third air guide device 270, and the discharge passage 282a of the second discharge guide device 280 may be discharged from the third fan 330 and discharged to the outside through the second discharge part 305 positioned above the third fan 330.

The third fan motor 335 may be coupled to the lower side of the third fan 330.

The first fan motor 165 and the second fan motor 265 may be arranged in a line with respect to the longitudinal direction of the air cleaner 10. The second fan motor 265 and the third fan motor 335 may be arranged in a line with respect to the longitudinal direction of the air cleaner 10.

Referring to FIG. 8, the flow switching device 300 further includes a flow guide part 320 coupled to the lower side of the third fan housing 310 to guide the air passing through the second discharge guide device 280 to the third fan housing 310. The flow guide part 320 includes an inlet grill 325 configured to guide the inflow of air into the third fan housing 310. The inlet grill 325 may have a downwardly concave shape.

The second outlet grill 288 of the second discharge guide device 280 has a downwardly concave shape corresponding to the shape of the inlet grill 325. The inlet grill 325 may be seated on the upper side of the second outlet grill 288. With this configuration, the inlet grill 325 may be stably supported by the second outlet grill 288.

The flow switching device 300 further includes a rotation guide device 350 provided under the flow guide part 320 to guide the rotations of the flow switching device 300 in the left-and-right direction and the vertical direction. The rotation in the left-and-right direction may refer to rotation clockwise or counterclockwise with respect to the axial direction. The rotation in the left-and-right direction may be referred to as a "first direction rotation" and the rotation in the vertical rotation may be referred to as a "second direction rotation".

The rotation guide device 350 includes a guide body 351 coupled to the flow guide part 320. The guide body 351 includes a lower surface part 351a on which the first and second guide tools are provided, and a rim part 351b provided on the rim of the lower surface part 351a and configured to protrude downward.

The rotation guide device 350 includes a first guide tool configured to guide the first direction rotation of the flow switching device 300, and a second guide tool configured to guide the second direction rotation of the flow switching device 300.

In detail, the first guide tool includes a first gear motor 363 configured to generate a driving force and a first gear 360 coupled to the first gear motor 363 to be rotatable. For example, the first gear motor 363 may include a step motor that facilitates control of a rotation angle. The first gear motor 363 may include a motor capable of bidirectional rotation.

The first gear 360 is coupled to a motor shaft of the first gear motor 363. The first guide tool further includes the first gear shaft 362 extending downward from the first gear 360, that is, extending toward the third air guide device 270 or the second discharge guide device 280.

The first gear 360 is geared to the first rack 276 of the third air guide device 270. A plurality of gear teeth are formed in the first gear 360 and the first rack 276. When the first gear motor 363 is driven, the first gear 360 rotates and interlocks with the first rack 276. At this time, since the third air guide device 270 has a fixed configuration, the first gear 360 may be movable along the first rack 276.

The shaft guide groove 277 of the third air guide device 270 may guide the movement of the first gear 360. In detail, the first gear shaft 362 may be inserted into the shaft guide groove 277. The first gear shaft 362 may be movable in the circumferential direction along the shaft guide groove 277 while the first gear 360 is rotating.

According to an embodiment, the rotation shaft forming the center of rotation when the flow switching device 300 rotates according to the driving of the first gear motor 363 may be further formed on the lower surface part 351a of the guide body 351. In detail, the rotation shaft may protrude downward from the lower surface part 351a. In this case, a shaft insertion part into which the rotation shaft is inserted may be further formed on the bottom surface 273 of the third air guide device 270. The rotation shaft may be inserted into the shaft insertion part of the third air guide device 270 and may be rotatable within the shaft insertion part.

That is, when the first gear 360 rotates, the first gear shaft 362 and the first gear 360 rotate about the rotation shaft in the circumferential direction. The rotation shaft rotates within the shaft insertion part 284. Therefore, the flow switching device 300 may be rotatable in the first direction, that is, clockwise or counterclockwise, with the longitudinal direction as the axial direction.

The first guide tool further includes a bearing 355 that facilitates the first direction rotation of the flow switching device 300. The bearing 355 may reduce a frictional force generated during the rotation of the flow switching device 300.

The bearing 355 may be rotatably provided on the rim part 351b. A bearing insertion part 351c to which the bearing 355 is coupled may be defined in the rim part 351b. The bearing insertion part 351c may be recessed upward from the bottom surface of the rim part 351b. A plurality of bearings 355 may be provided.

The bearing 355 may be provided to be in contact with the inner wall 272 of the third air guide device 270 or the discharge inner wall 282 of the second discharge guide device 280. That is, the inner circumferential surface of the inner wall 272 or the discharge inner wall 282 may form the contact surface of the bearing 355. As the bearing 355 rotates about the rotation shaft along the inner circumferential surface of the discharge inner wall 282, the first direction rotation of the flow switching device 300 may be easily achieved.

On the other hand, the flow switching device 300 according to an embodiment of the present disclosure may further include a wireless power receiver 800 disposed between the flow guide part 320 and the rotation guide device 350. FIGS. 7 and 8 illustrate that the wireless power receiver 800 is implemented as a separate configuration from the rotation guide device 350, but according to an embodiment, the wireless power receiver 800 may be integrally formed with the rotation guide device 350.

For example, the wireless power receiver 800 may be implemented inside a circular plate. The receiver 806 corresponding to the shape of the circular plate may be provided inside the circular plate. The receiver 806 may be implemented as a receiving coil. The receiving coil may be disposed to face the transmitter 708 provided in the third air guide device 270. Therefore, the power transmission efficiency through the wireless power transmission method may be maximized.

FIG. 9 is an exploded perspective view of the flow switching device according to an embodiment of the present disclosure, when viewed from above.

Referring to FIGS. 8 and 9, the flow switching device 300 according to an embodiment of the present disclosure includes a second guide tool configured to guide the vertical rotation of the flow switching device 300.

On the other hand, for convenience of description, it is assumed that the rotation guide device 350 and the wireless power receiver 800 are integrally formed. That is, the circular plate of the wireless power receiver 800 may be integrally formed with the guide body 351 of the rotation guide device 350.

In detail, the second guide tool includes a fixed guide member 352 fixed to the guide body 351. The central shaft may be provided on the lower surface of the fixed guide member 352.

The fixed guide member 352 includes a first guide surface 352a that supports the lower side of the rotation guide member 370 and guides the second direction rotation of the rotation guide member 370. The first guide surface 352a may form at least a portion of the upper surface of the fixed guide member 352, and may extend to be round upward in correspondence to the rotation path of the rotation guide member 370.

The fixed guide member 352 further includes a first guide bearing 359 provided in contact with the rotation guide member 370 to reduce a frictional force generated during the rotation of the rotation guide member 370. The first guide bearing 359 may be positioned on the side of the first guide surface 352a.

The fixed guide member 352 further includes a second gear insertion part 352b into which the second gear 365 may be inserted for the rotation of the rotation guide member 370. The second gear insertion part 352b is defined on one side of the first guide surface 352a. For example, the second gear insertion part 352b may be formed by cutting at least a portion of the first guide surface 352a.

The second gear 365 is positioned under the first guide surface 352a, and at least a portion of the second gear 365 may be configured to protrude upward from the second gear insertion part 352b through the second gear insertion part 352b.

The second guide tool further includes a second gear motor 367 coupled to the second gear 365 to provide a driving force. For example, the second gear motor 367 may include a step motor. The second gear motor 367 may include a motor capable of bidirectional rotation.

The second guide tool further includes a second gear shaft 366 extending from the second gear motor 367 to the second gear 365. The second gear shaft 366 may protrude laterally from the second gear motor 367. When the second gear motor 367 is driven, the second gear shaft 366 and the second gear 365 may rotate together.

The second guide tool further includes a rotation guide member 370 disposed above the fixed guide member 352 and rotatably provided in the vertical direction. The rotation guide member 370 may be coupled to the lower side of the flow guide part 320.

In detail, the rotation guide member 370 includes a main body part 371 supported by the fixed guide member 352. The main body part 371 includes a second guide surface 372 that moves along the first guide surface 352a. The second guide surface 372 may be formed to be round downward in correspondence to the curvature of the first guide surface 352a.

The rotation guide member 370 further includes a second guide bearing 375 provided in contact with the fixed guide member 352 to reduce a frictional force generated during the rotation of the rotation guide member 370. The second guide bearing 375 is positioned on the side of the second guide surface 372, and may move along the first guide surface 352a while the rotation guide member 370 is rotating.

The rotation guide member 370 further includes a second rack 374 interlocking with the second gear 365. A plurality of gear teeth may be formed in the second gear 365 and the second rack 374, and the second gear 365 and the second rack 374 may be geared to each other through the plurality of gear teeth.

When the second gear motor 367 is driven, the second gear 365 and the second rack 374 interlock with each other so that the rotation guide member 370 performs the vertical rotation movement. Therefore, the flow switching device 300 may perform the second direction rotation according to the movement of the rotation guide member 370.

When the second gear motor 367 operates, the second gear 365 may rotate. The second gear motor 367 rotates clockwise or counterclockwise with respect to the radial direction, and the second gear 365 may rotate clockwise or counterclockwise in response thereto.

As an example, when the second gear motor 367 rotates clockwise, the second gear 365 may rotate clockwise and the second rack 374 may interlock with the second gear 365 to rotate counterclockwise. As the second rack 374 rotates, the rotation guide member 370 and the flow guide part 320 may rotate together. As a result, the fan housing 310 may rotate counterclockwise.

On the other hand, when the second gear motor 367 rotates counterclockwise, the second gear 365 may rotate counterclockwise and the second rack 374 may interlock with the second gear 365 to rotate clockwise. As the second rack 374 rotates, the rotation guide member 370 and the flow guide part 320 may rotate together. As a result, the fan housing 310 may rotate clockwise.

Due to this operation, the flow switching device 300 may be stably rotated along a set path in the vertical direction.

FIGS. 10 and 11 are views showing a state in which the flow switching device according to an embodiment of the present disclosure is in a second position.

FIGS. 10 and 11 show a state in which the flow switching device 300 protrudes upward from the second discharge guide device 280, that is, a state in which the rotation guide member 370 rotates upward and the fan housing 310 is erected upward (second position). On the other hand, FIGS. 1 and 2 show a state in which the flow switching device 300 is lying (first position).

That is, the flow switching device 300 may be rotatable up and down in the direction "B" shown in FIG. 10, and may be in the first position or the second position. When the flow switching device 300 is in the first position, the inlet grill 325 is seated on the upper surface of the second outlet grill 288. On the other hand, when the flow switching device 300 is in the second position, the inlet grill 325 may be spaced upward from the upper surface of the second outlet grill 288.

The third fan 330 may selectively operate according to whether the flow switching device 300 is in the first position or the second position.

In detail, when the flow switching device 300 is in the first position, the first and second fans 160 and 260 may rotate to generate air flow. Due to the operation of the first fan 160, air suction and discharge (first flow) in the lower portion of the air cleaner 10 may be generated. Due to the operation of the second fan 260, air suction and discharge (second flow) in the upper portion of the air cleaner 10 may be generated. The first flow and the second flow may be separated by the partition device 400.

The third fan 330 may selectively operate. When the third fan 330 operates, the second flow may be generated more strongly. That is, the second fan 260 and the third fan 330 may generate strong discharge air flow in the upper portion of the air cleaner 10, and the discharge air flow may be discharged through the second discharge part 305. Of course, the third fan 330 may not operate.

On the other hand, when the flow switching device 300 is in the second position, the first and second fans 160 and 260 may rotate to generate the first and second air flows. The third fan 330 may operate.

Due to the operation of the third fan 330, at least a portion of the air discharged through the discharge passage 282a of the second discharge guide device 280 may be introduced into the third fan housing 310, and may be discharged from the second discharge part 305 through the third fan 330. Due to this operation, the purified air may reach a location far away from the air cleaner 10 (see FIG. 14).

When the flow switching device 300 is in the second position, the flow switching device 300 may be rotated in the left-and-right direction with respect to the axial direction. In particular, when the flow switching device 300 is in the second position, the flow switching device 300 may rotate 360 degrees in the left-and-right direction with respect to the axial direction. FIG. 10 shows a state in which the flow switching device 300 is positioned to face one direction (left direction based on FIG. 10) in the second position.

As such, since the flow switching device 300 can rotated in the left-and-right direction with respect to the axial direction, there is an effect that the discharge air flow can be sent to a long distance in various directions with respect to the air cleaner 10.

On the other hand, the wireless power receiver 800 is provided in the rotation guide device 350 of the flow switching device 300 and does not rotate in the vertical direction. Therefore, even in a state in which the flow switching device 300 is in the second position, the receiver 806 (receiving coil) may maintain the state facing the transmitter 708 (transmitting coil) of the wireless power transmitter 700. Therefore, even when the flow switching device 300 is in the second position, the wireless power transmission efficiency may not deteriorate.

FIGS. 12 to 14 are views showing air flow in the air cleaner according to an embodiment of the present disclosure.

First, the flow of air according to the driving of the first air blower 100 will be described. When the first fan 160 is driven, indoor air is sucked into the first case 101 through the first suction part 102 and the base suction part 103. The sucked air may pass through the first filter member 120, and in this process, foreign matter in the air may be filtered. While the air passes through the first filter member 120, the air is sucked and filtered in the radial direction of the first filter member 120 and then flows upward.

The air passing through the first filter member 120 flows radially upward while passing through the first fan 160, and a stable upward flow is achieved while passing through the first and second air guide devices 170 and 180. The air passing through the first and second air guide devices 170 and 180 passes through the first discharge guide device 190 and flows upward through the first discharge part 105.

The air discharged through the first discharge part 105 is guided by the partition plate 430 disposed above the first discharge guide device 190 and discharged to the outside of the air cleaner 10.

On the other hand, when the second fan 260 is driven, indoor air is sucked into the second case 201 through the second suction part 202. The sucked air may pass through the second filter member 220, and in this process, foreign matter in the air may be filtered. While the air passes through the second filter member 220, the air is sucked and filtered in the radial direction of the first filter member 120 and then flows upward.

The air passing through the second filter member 220 flows radially upward while passing through the second fan 160, and a stable upward flow is achieved while passing through the third air guide device 270 and the second discharge guide device 280. The air passing through the third air guide device 270 and the second discharge guide device 280 may be discharged through the second discharge part 305 via the flow switching device 300.

The flow switching device 300 may be provided to be rotatable in the vertical direction by the second guide tool. For example, as shown in FIGS. 12 to 14, when the flow switching device 300 is in the first position, the air discharged from the flow switching device 300 flows upward.

On the other hand, when the flow switching device 300 is in the second position, the air discharged from the flow switching device 300 may flow toward the front upper side. Due to the flow switching device 300, the amount of air discharged from the air cleaner 10 may increase, and the purified air may be supplied to a location far away from the air cleaner 10.

In detail, when the third fan 330 of the flow switching device 300 is driven, at least a portion of the air discharged from the second discharge guide device 280 may be introduced into the third fan housing 310. The introduced air may pass through the third fan 330 and may be discharged to the outside through the second discharge part 305.

On the other hand, when the flow switching device 300 is in the second position, the flow switching device 300 may be rotated in the left-and-right direction by the first guide tool. As an example, as shown in FIGS. 10 and 11, when the flow switching device 300 faces the front upper side, the air discharged through the second discharge part 305 may flow toward the front upper side. On the other hand, when the flow switching device 300 is rotated toward the rear upper side, the air discharged through the second discharge part 305 may flow toward the rear upper side.

Due to this operation, since the air discharged from the air cleaner 10 can be directed forward rather than simply upward, the air flow toward the space relatively far from the air cleaner 10 can be generated. Since the flow switching device 300 is provided with a separate third fan 330, the blowing force of the discharged air can be increased.

In addition, since the flow switching device 300 can perform the first direction rotation, air can be discharged to both sides of the front of the air cleaner 10. Therefore, there is an effect that air flow can be provided toward a relatively large indoor space.

In particular, the flow switching device 300 includes the wireless power receiver 800 that receives power wirelessly from the wireless power transmitter 700 provided in the main body 100+200 or the second air blower 200, and thus can operate with the received power without wired connection to the second air blower 200. Therefore, when the flow switching device 300 rotates in the first direction, problems such as twisting of the electric wires do not occur, and thus the flow switching device 300 may rotate 360 degrees in the first direction. That is, since the flow switching device 300 is capable of discharging air in all directions, it is possible to effectively provide purified air to various areas of the indoor space.

The flow switching device 300 may operate selectively according to the operation mode of the air cleaner 10. When the air cleaner 10 operates in the normal operation mode (first operation mode), the flow switching device 300 is in the first position, that is, the lying state, as shown in FIGS. 12 and 13. The first and second air blowers 100 and 200 may be driven to form a plurality of independent air flows.

That is, when the first air blower 100 is driven, air may be sucked through the first suction part 102 and the base suction part 103, and may be discharged through the first discharge part 105 through the first filter member 120 and the first fan 160. When the second air blower 200 is driven, air may be sucked through the second suction part 202, may pass through the second filter member 220 and the second fan 260, and may pass through the third fan 330. The air may be discharged upward through the second discharge part 305. At this time, the third fan 330 may be turned off. Of course, the third fan 330 may be driven in order to strongly form the discharge air flow toward the second discharge part 305.

On the other hand, the flow switching device 300 may change the air flow in both directions of the front of the air cleaner 10 while rotating in the first direction in the first position.

On the other hand, when the air cleaner 10 operates in the flow switching mode (second operation mode), the flow switching device 300 may rotate upward and protrude from the upper end of the air cleaner 10 as shown in FIG. 14. On the other hand, in the flow switching mode, the driving of the first and second air blowers 100 and 200 may be the same as the driving of the first and second air blowers 100 and 200 in the normal operation mode.

The third fan 330 is driven, and thus at least a portion of the air passing through the discharge passage 282a of the second fan 260 and the second discharge guide device 280 is introduced into the third fan housing 310. At least a portion of the introduced air may be discharged toward the front upper side or the rear upper side of the air cleaner 10 while passing through the third fan 330.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. An air cleaner comprising:
a main body comprising a main fan configured to generate air flow, a discharge part through which air passing through the main fan is discharged, a wireless power transmitter disposed on one side, and a power supply connected to the wireless power transmitter; and
a flow switching device movably provided on the one side of the main body,
wherein the flow switching device comprises:
a first guide tool configured to guide a first direction rotation of the flow switching device;
a second guide tool configured to guide a second direction rotation of the flow switching device; and
a wireless power receiver configured to supply power to the first guide tool and the second guide tool.

2. The air cleaner of claim 1, wherein the wireless power transmitter comprises a transmitting coil, and
wherein the wireless power receiver comprises a receiving coil disposed adjacent to the one side of the main body to face the transmitting coil.

3. The air cleaner of claim 2, wherein the main body and the flow switching device are aligned in a vertical direction, and
the first direction rotation is a clockwise or counterclockwise rotation with respect to the vertical direction.

4. The air cleaner of claim 3, wherein the main body further comprises:
an air guide device disposed on an outlet side of the main fan; and
a discharge guide device disposed on an outlet side of the air guide device.

5. The air cleaner of claim 4, wherein the air guide device comprises:
an outer wall defining an outer circumferential surface;
an inner wall disposed inside the outer wall to define an inner circumferential surface; and
a bottom surface defined inward from a lower side of the inner circumferential surface, and
wherein the transmitting coil is provided inside the bottom surface or on the bottom surface.

6. The air cleaner of claim 5, wherein the air guide device further comprises a first rack formed along the inner wall in a ring shape, and
wherein the first guide tool comprises:
a first gear geared to the first rack; and
a first gear motor connected to the first gear and configured to receive power from the wireless power receiver.

7. The air cleaner of claim 6, wherein the discharge guide device has a through-hole formed therein, and
wherein the first gear passes through the through-hole and is geared to the first rack.

8. The air cleaner of claim 7, wherein the first guide tool further comprises a guide body provided with the first gear on a lower surface portion,
wherein the receiving coil is provided in the guide body, and
wherein the guide body is accommodated in the through-hole or is accommodated in the inner wall of the air guide device.

9. The air cleaner of claim 8, wherein the first guide tool further includes a rotation shaft formed on a lower surface portion of the guide body, and
wherein a shaft insertion part into which the rotation shaft is inserted is defined on the bottom surface of the air guide device.

10. The air cleaner of claim 6, further comprising a shaft guide groove which is defined on the bottom surface of the air guide device and into which a portion of a gear shaft of the first gear is inserted,
wherein the shaft guide groove is defined in a ring shape corresponding to the first rack.

11. The air cleaner of claim 3, wherein the second direction is an upward or downward rotation.

12. The air cleaner of claim 11, wherein the second guide tool comprises:

a second gear motor enabling bidirectional rotation and electrically connected to the wireless power receiver; and a second gear connected to the second gear motor.

13. The air cleaner of claim 12, wherein the second guide tool further comprises:

a rotation guide member rotatably provided in a vertical direction; and a fixed guide member having a first guide surface supporting a lower side of the rotation guide member, and wherein the first guide surface extends to be round upward.

14. The air cleaner of claim 13, wherein the rotation guide member comprises a second rack geared to the second gear.

15. The air cleaner of claim 14, wherein the fixed guide member further comprises a gear insertion part into which the second gear is inserted, and wherein the second gear passes through the gear insertion part from the first guide surface and is geared to the second rack.

16. The air cleaner of claim 1, further comprising:

the flow switching device comprises a sub-fan configured to generate air flow; and a fan motor connected to the sub-fan, and wherein the fan motor is electrically connected to the wireless power receiver.

17. The air cleaner of claim 1, further comprising a display device provided above the flow switching device, wherein the display device is electrically connected to the wireless power receiver.

18. The air cleaner of claim 1, wherein the wireless power receiver is provided under the flow switching device.

19. The air cleaner of claim 1, wherein the flow switching device includes an inlet grill configured to guide an inflow of air, wherein the wireless power receiver is provided under the inlet grill.

20. The air cleaner of claim 1, wherein the wireless power receiver is provided on a guide body of the first guide tool.

* * * * *